Re. 24804
March 12, 1957     C. SHORTS     2,784,763
METHOD AND APPARATUS FOR MAKING FIBER-REINFORCED
SHEET MATERIAL
Filed Oct. 2, 1952     5 Sheets-Sheet 1
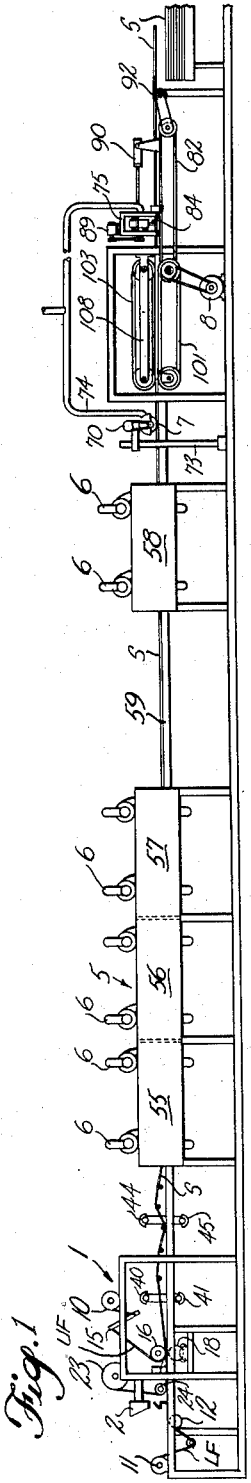
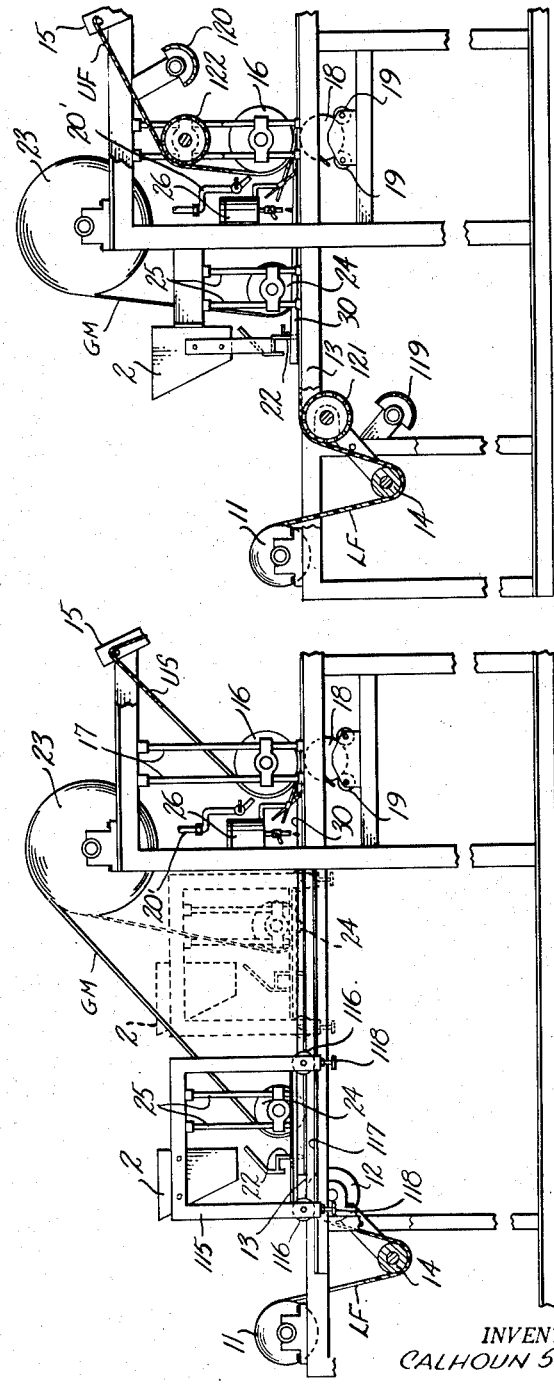
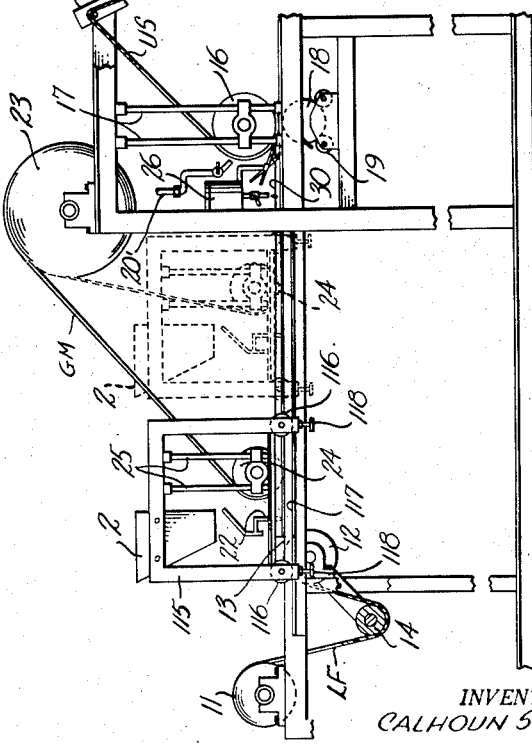
INVENTOR.
CALHOUN SHORTS
BY
Reynolds, Beach & Christensen
ATTORNEYS

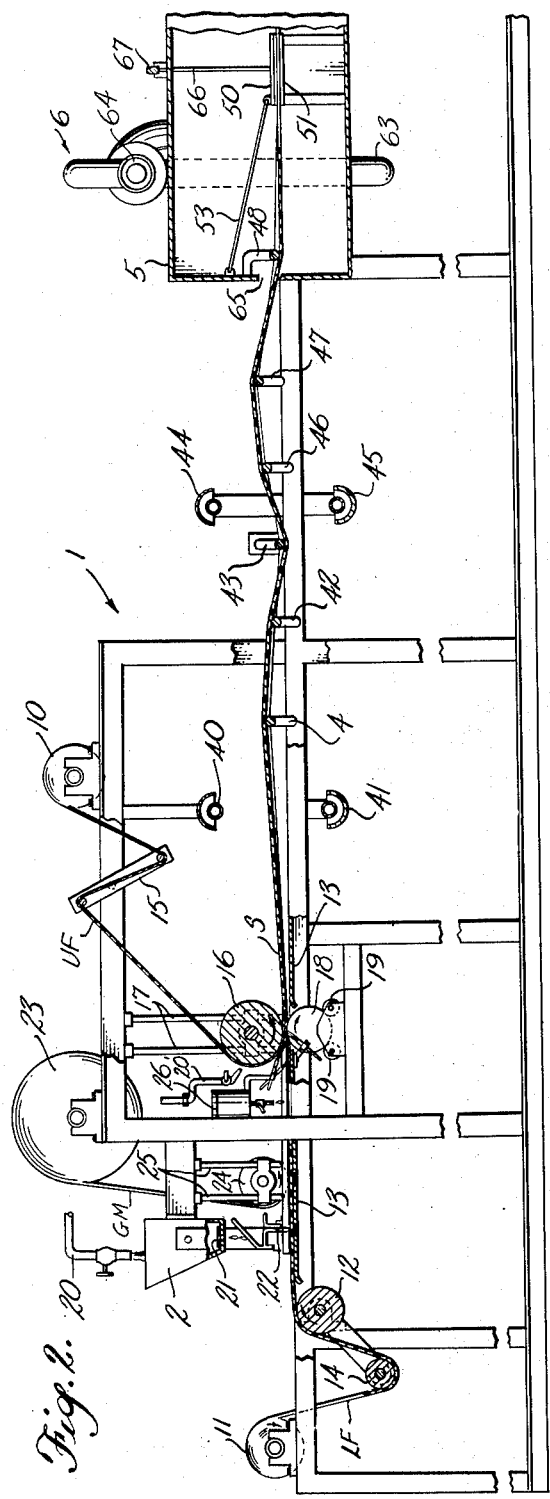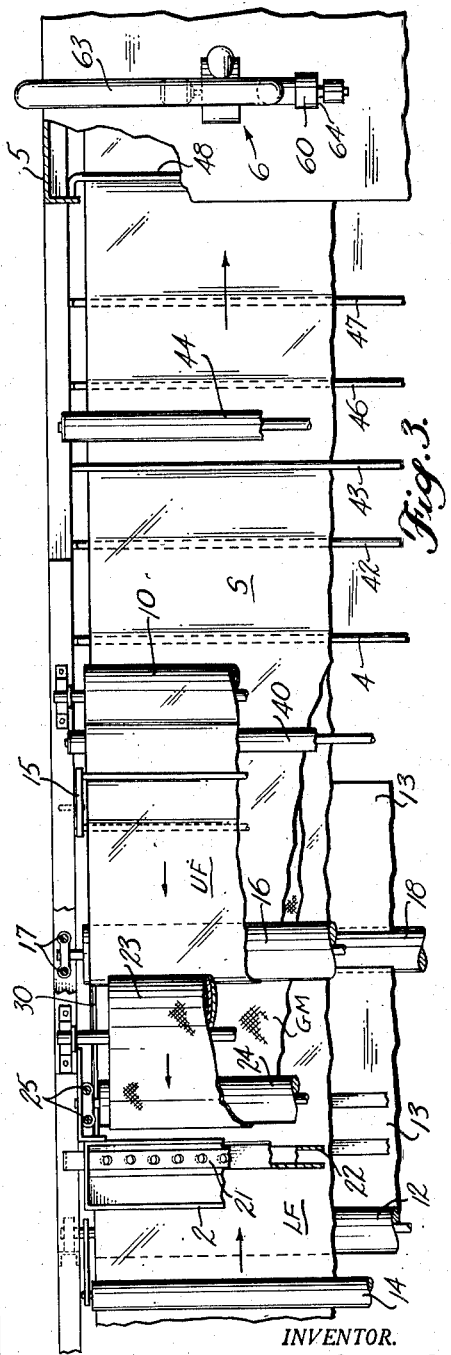

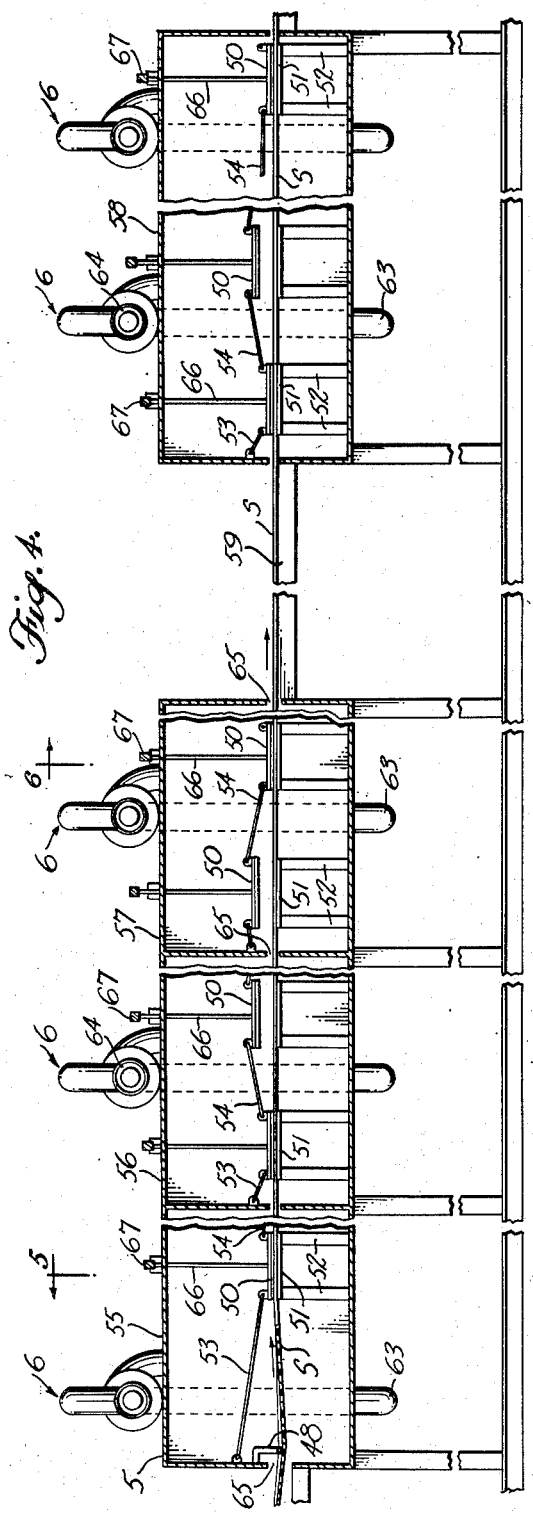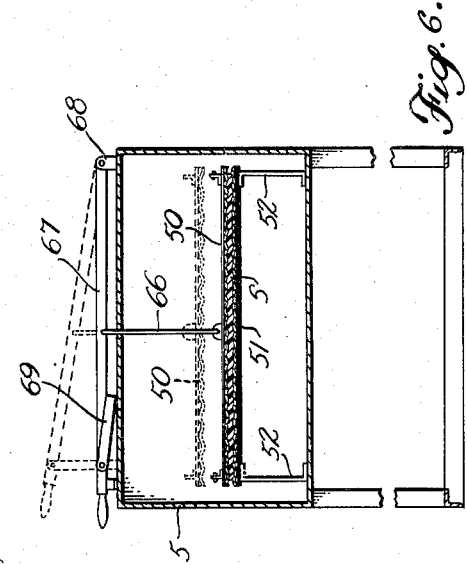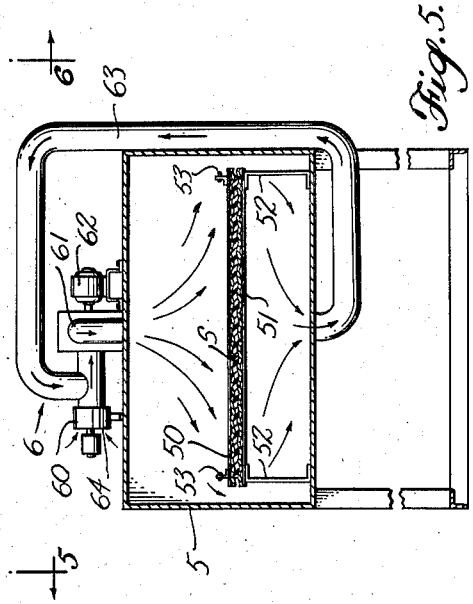

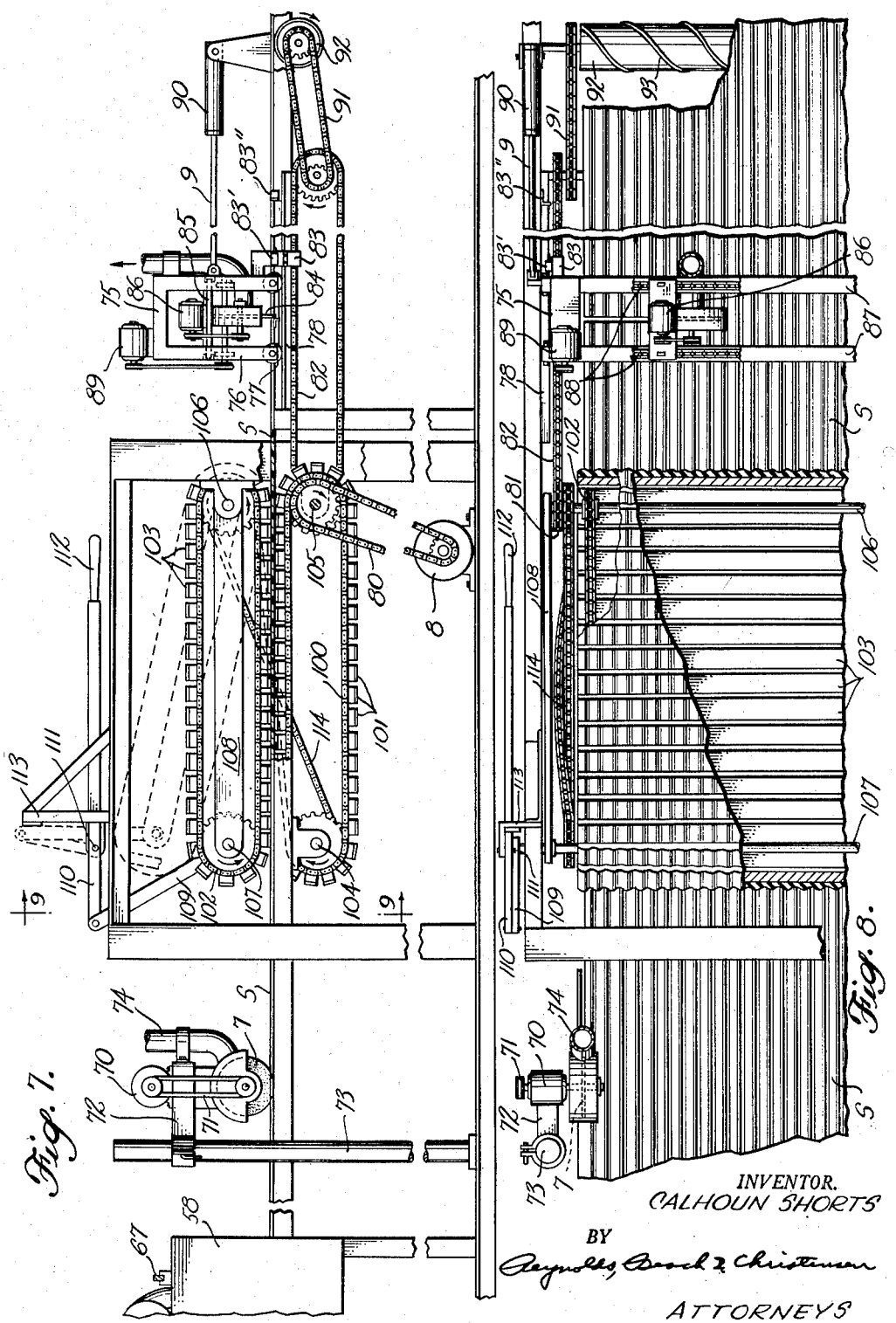

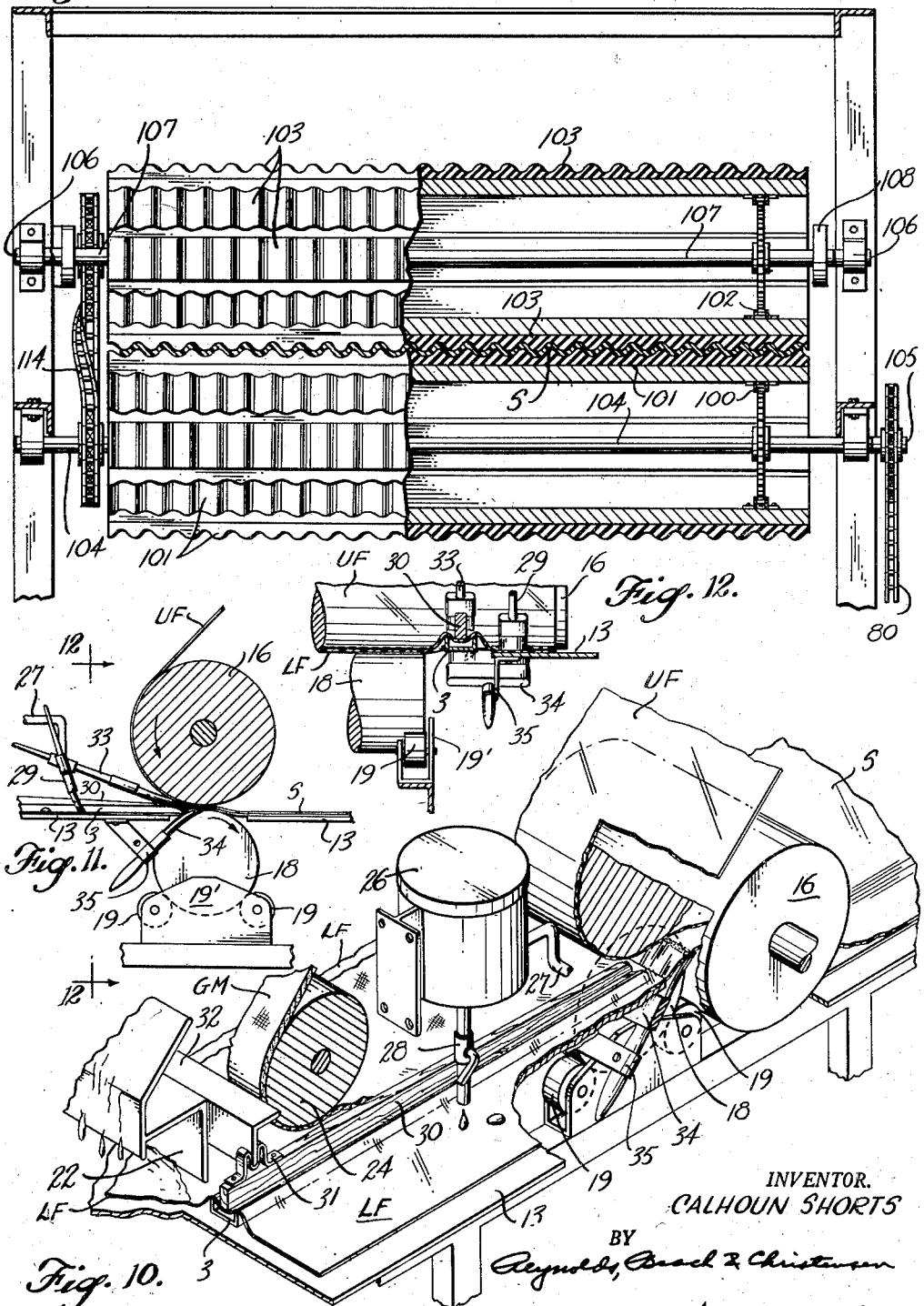

United States Patent Office 2,784,763
Patented Mar. 12, 1957

2,784,763

METHOD AND APPARATUS FOR MAKING FIBER-REINFORCED SHEET MATERIAL

Calhoun Shorts, near Bellevue, Wash.

Application October 2, 1952, Serial No. 312,819

25 Claims. (Cl. 154—1.75)

The apparatus of this invention is utilized for performing a continuous process of production of sheet material, and in particular of translucent, fiber-reinforced resin sheet.

While the apparatus hereinafter described may be used in the manufacture of sheet material of various types, it is intended particularly for use in making a resin sheet reinforced with glass or comparable fibers embedded in the set resin.

An object of the present apparatus is to produce such fiber-reinforced resin sheet by a continuous process uniformly and accurately, although rapidly. Such product will be smooth, hard, strong and of uniform thickness, having substantially no occluded air bubbles. Such apparatus is substantially automatic in operation so that it can produce the sheet material rapidly and economically, can be prepared quickly to begin production and requires minimum attention and interruption after initiation of production.

It is also an object in setting the resin by application of heat to utilize such heat effectively and economically without any portions of the sheet area being overheated or insufficiently cured.

It is a further object of the apparatus to form the sheet as it is produced into any desired cross-sectional shape: flat, corrugate, V-crimp, channel, arcuate, etc.

A particular object where surface films of material subject to shrinking by the application of heat are used is to preheat such surface films before the resin has been set appreciably, so that substantially all of the surface film shrinking is completed before the sheet is formed to its desired cross-sectional shape, and the setting action of the resin has progressed appreciably.

An additional object of the apparatus is to edge trim the sheet as it is produced and to cut it off into desired lengths without interrupting the continuous production process.

It is also an object to move the sheet material through the entire apparatus by traction on the formed sheet applied at the discharge end of the apparatus.

Essentially the apparatus draws through it upper and lower surface films, constituting carrier elements. Resin is fed onto the lower surface film, leveled to a predetermined depth and retained upon the film as a pool not extending closer to the edges of the film than approximately two inches. Into the resin is laid the reinforcing fiber material. The reinforcing material sinks into the pool of resin and all air in the reinforcing material is displaced by the resin. The upper surface film is applied, and the composite sheet is rolled to consolidate the laminated structure to a predetermined thickness while the edge portions of the surface films from which resin has been excluded are sealed with a ribbon of suitable adhesive. The laminated structure is then drawn through a series of forming shoes while the sheet is heated to set the resin. Such shoes may be flat or of corrugated or other desired form. The set resin is then cooled, and the finished sheet material is edged and cut into panels of desired length.

Additional features and advantages of the sheet forming apparatus will be discussed in the following detailed description of it.

Figure 1 is a general side elevation view of typical sheet forming apparatus according to the present invention.

Figure 2 is a side view of the feed end of the apparatus with parts broken away to show internal structure, and Figure 3 is a plan view of one side of this portion of the apparatus with parts broken away.

Figure 4 is a longitudinal vertical section through the central portion of the apparatus, Figure 5 is a transverse section through such portion on line 5—5 of Figure 4, and Figure 6 is a transverse section through such portion of the apparatus on line 6—6 of Figure 4.

Figure 7 is a side view of the discharge end of the apparatus with parts broken away, and Figure 8 is a plan view of such portion of the apparatus having parts broken away. Figure 9 is an enlarged transverse section through the apparatus taken on line 9—9 of Figure 7.

Figure 10 is a top perspective view of a fragmentary portion of the feed end of the apparatus having parts broken away, Figure 11 is a fragmentary side elevation view of the same portion of the apparatus, and Figure 12 is a fragmentary sectional view of such portion of the apparatus taken on line 12—12 of Figure 11.

Figure 13 is a side elevation view of the feed end of a modified type of sheet forming apparatus.

Figure 14 is a side elevation view of the feed end of still a different type of sheet forming apparatus.

The apparatus is composed of three principal sections. The first of these is the feed section in which supplies of upper and lower surface film material, resin and glass mat are provided, fed into the machine and consolidated into mat form. The second section is the resin-setting section in which the composite sheet is formed into the desired shape, such as corrugated, and the resin is first heated, then cooled and finally reheated to effect setting of the resin. The third section of the machine is the propelling and trimming section which incorporates the power mechanism operable to pull the composite sheet through the machine and trim mechanism for edging the sheet and cutting it into sections of desired length.

Glass mat, which is the preferred type of reinforcing material used in manufacturing the fiber reinforced resin sheet product, is composed of a number of layers of glass fiber bundles, crossing at random and bonded loosely together with resin. Each bundle of fibers is composed of strands two or three inches in length, untwisted but of sufficient number to form a heavy thread. These bundles of strands are bonded together securely enough to form a loose mat which can be handled without coming apart. Glass roving which is another type of reinforcing material which may be used in manufacturing fiber-reinforced resin sheet is a loose aggregate of continuous glass fibers wound as a yarn upon a spool. When used with this apparatus sufficient spools of roving are placed above the apparatus and their ends in close parallel alignment are drawn through the apparatus just as is the glass mat in the description to follow.

Glass cloth or other woven fibers may also be used in this apparatus to manufacture reinforced resin sheet.

The resin preferred for use in the manufacture of sheet material produced by the present apparatus is one of low viscosity which will readily impregnate the reinforcing material and on exposure to heat will set into a hard, dense infusible state. For translucency a clear light-stable resin is desirable. For decorative purposes a light-colored resin which may be tinted by the addition of pigments or dies, is desirable. For clarity a resin which has an index of refraction closely matching that of the reinforcing material is desirable. All these characteristics may be found in a family of resins called "polyesters," which are well known to be settable by the process of polymerization.

The material used for the surface elements should be thin, nonporous, inexpensive, and sufficiently strong to carry the resin and reinforcing fiber material entirely through the sheet forming apparatus without being ruptured. It has been found that cellulose film, that is, cellophane, meets these requirements, although it is entirely feasible to use other material such as cellulose acetate film and polyethylene film, for example, which, like cellophane, will part from the set resin sheet, or polyester film which will adhere to the resin and become an integral part of the finished sheet.

The operation of the apparatus will be described using cellophane as the surface films, glass mat as the reinforcing mtaerial, and polyester type resin.

The surface film material is supplied in the form of rolls, and in the feed section 1 of the machine is mounted an upper surface film roll 10 and a lower surface film roll 11 shown in Figure 1. A guide roll 12, over which the lower surface film passes, is located so that the upper side of its periphery is coplanar with the surface of the mat forming table 13. Surface film material UF from the roll 11 passes downward under a tightener roll 14, braked or of friction type to tension the material in the direction of its movement, and then up over the roll 12 onto the mat forming table. From the roll 10 the upper surface film material passes around the tightener 15, the rolls of which may be suitably braked to tension the film, and then under a guide roll 16 mounted for vertical movement, guided by rods 17 in registry with a lower roll 18, to exert pressure on the sheet being formed.

It will be seen that the lower surface film material LF passes along the forming table for a considerable distance between the roll 12 and the roll 16 before the upper film material is laid over it. During this travel resin utilized in formation of the sheet is spread on the lower surface film from a row of apertures in the bottom of the resin trough 2 which may be supplied continually or intermittently as required from a reservoir by a supply pipe 20. The flow of resin from the apertures of this container is regulated in accordance with the speed of travel of the surface film material by appropriate adjustment of a slide valve plate 21 in the trough bottom apertured correspondingly to the apertures in the trough bottom so that the proper amount of resin is furnished to form a sheet of the desired thickness. The resin thus supplied is leveled and reduced to the exact thickness desired by the doctor blade 22 extending across the sheet forming table. The elevation of the doctor blade may be regulated to provide the correct amount of resin depth.

It has been found that air bubbles in the finished sheet are greatly reduced by laying the reinforcing material into a layer of resin rather than first running the reinforcing material through a dip tank or placing the reinforcing material on the lower surface film and spreading the resin upon it. When fibrous reinforcing material is laid upon a layer of resin and time is allowed for it to sink into the resin, air in and between bundles of fibers is displaced upward as impregnation progresses and no air is trapped. This is not true of any other method of impregnation and is one of the novel features of this apparatus and method.

If the quantity of resin supplied on the lower surface film LF is not quite great enough to saturate the reinforcing material, some additional resin, as necessary, may be added on top of the reinforcing material after it has sunk into contact with the lower surface film.

A roll of glass mat 23 is supported on the frame of section 1, and the glass mat sheet GM passes around and beneath the glass mat laying guide roll 24 which is disposed just above the upper surface of the resin layer and guided for vertical adjustment along guide rods 25. Between the roll 24 and the pressure roll 16, therefore, the glass mat will be inclined at a very small angle relative to the sheet forming table 13, so that the glass mat will gradually be lowered into the resin before the surface film is applied to the upper side of the resin and glass mat. Additional resin may be supplied from an auxiliary supply pipe supported just ahead of the rolls 16 and 18. Resin may be dispensed from this conduit through a spout 20', which can be swung to various positions in which an operator may note that the supply of resin on the glass mat is inadequate. An excess of resin at this point will not be objectionable, because the rolls 16 and 18 will squeeze it back and distribute it so that a uniform character of composite sheet will be discharged from the rolls.

The resin used in the fabrication of the sheet material is quite fluid, and when leveled on the lower surface film by the doctor blade 22, tends to spread laterally toward the edges of such surface film. In order to provide a resin pool of sufficient depth to fully impregnate the glass mat as it is laid into the resin, it is necessary to provide a barrier along each edge of the lower surface film on the table 13 ahead of pressure roll 16, and to prevent leakage of resin out of the pool a tight seal must be provided between the barrier and the periphery of roll 16. While such barrier and sealing mechanism is shown generally in Figure 2, the details of it are shown more clearly in Figures 10, 11 and 12. Since the mechanism is the same at opposite sides of the lower surface film, it will be necessary to describe only that at one side as shown in these figures.

From a location at least some distance to the feed side of the doctor blade 22 to a location closely adjacent to the periphery of roll 16 extends a narrow channel member 3 with its web lying on the table 13 and with its flanges projecting upwardly. This channel extends parallel to the direction of movement of the sheet material, and received partially in the channel and riding on the lower surface film LF is a strip 30 preferably of wood. The feed end of this strip is held by a spring clip 31 secured to it and engaged with a bar 32 supported from the frame of the apparatus, such as on the doctor blade 22. The strip 30 is so positioned that it presses the cellophane film somewhat into the channel 3, as shown in Figures 10 and 12, and produces a tight seal between the lower edge of the strip and such film. No support or presser element need be provided for the rest of the strip because its weight and the pressure on it reacting from roll 16, as described below, will be sufficient to hold it in firm sealing engagement with the lower film. The end of this strip is disposed as close as feasible to the periphery of such roll without actually contacting it, and the void between the strip end and such roll is filled by a further sealing element, such as a small paint brush 33, which may be supported conveniently from the adhesive dispensing container 26 by a clamp bracket 27, and will transmit light pressure from the roll onto the strip end.

While the brush 33 cooperating with the end of strip 30 adjacent to roll 16 must substantially fill the angle between the periphery of such roll and the lower surface film LF, the brush bristles must not be subjected to appreciable tractive effort of the lower and upper rolls tending to pull the brush between them.

The periphery of roll 18 is received in a slot extending transversely across table 13, and the periphery of such roll projects upward slightly above the upper surface of such table so as to maintain a pool of resin adjacent to the rolls through which the glass mat passes to insure its complete saturation before moving between the rolls. Conveniently the lower roll has each of its ends cradled in spaced rollers 19 suitably supported from the apparatus by a plate 19' carrying one end of each of rolls 19 and also serving as a stop to limit lengthwise movement of roll 18. Alongside the end of roll 18 is mounted a brush 34 beneath the table 13, and supported by a suitable bracket 35 carried by such table. This brush is inclined forwardly and upwardly to press the lower surface film LF against the brush 33 and the roll 16 to afford an effective seal preventing leakage of resin outwardly among the surfaces of this roll.

The glass mat sheet will be of a width to lie between the strips 30 so that only the lower surface film is pressed by such strips into the channel 3. The edge portions of such lower surface film outside of strips 30 resting on table 13 will thus be exposed, and adhesive may be dripped onto such marginal sheet portion from the container 26, the amount of adhesive thus applied being regulated by the valve 28. The drops of glue thus supplied may be spread to form a ribbon on the sheet, such as by a brush 29 also supported from the bracket 27 as shown in Figure 11, just before the upper surface film UF is applied by the roll 16. Such adhesive should be of the type which will set quickly, so that the upper and lower films are secured together shortly after the composite sheet passes the rolls 16 and 18.

The composite sheet materials discharged from rolls 16 and 18 will be composed of a central layer of glass mat thoroughly impregnated with unset resin having its upper and lower sides covered with transparent film material such as cellophane, the edges of which surface films LF and UF extend at least several inches beyond each edge of the glass mat filler, and such projecting marginal portions of the surface films are secured together by a ribbon of suitable adhesive to prevent exudation of resin and infiltration of air into the resin between the surface films.

As has been mentioned above special provision has been made for the use of surface film materials which shrink when exposed to heat. It has been found that when cellophane is employed for either or both surface films the heat applied to cure the resin causes the cellophane to shrink widthwise. The reinforcing material on the other hand does not shrink. As the reinforcing material is adhered by the resin to the surface of the cellophane, the narrowing of the cellophane causes the reinforcing material to bunch up into lengthwise wrinkles. In order to form a sheet of desired cross section and uniform thickness using cellophane for one or both surface films provision is made for preshrinking the cellophane and simultaneously reorienting the fibers of the reinforcing material with respect to the surface of the cellophane as shrunk.

In Figures 2 and 3 apparatus for preheating the upper and lower surface films UF and LF to shrink them is shown with mechanism for guiding the sheet material to iron out wrinkles resulting from shrinking of the surface films. The composite sheet material S described is raised from the table 13 at the discharge side of rolls 16 and 18, and bridges across to an upwardly arched bar 4 while passing between an upper heat lamp 40 and a lower heat lamp 41 which heat the upper and lower surface films, respectively. Because the sheet material is being pulled through the machine, shrinkage which occurs lengthwise of the direction of travel produces no appreciable effect on the sheet, but the transverse shrinking tends to cause lengthwise wrinkles which are ironed out by passage of the sheet in taut condition across the arched bar 4.

The shrinking of the upper and lower surface films does not occur instantaneously, but is a progressive action. Further wrinkles tend to form beyond the arched bar 4, therefore, resulting from the heating by lamps 40 and 41. The sheet is consequently drawn under tension across additional arched bars, including a second upwardly arched bar 42 and a downwardly arched bar 43. The relationship of bar 42 relative to bars 4 and 43 is such that bar 42 is offset from a line joining the central portions of bars 4 and 43 to iron the central part of the composite sheet, but most of the sheet width will not touch bar 42 but will span between bars 4 and 43.

Beyond the downwardly arched bar 43 the sheet may pass between additional heat lamps 44 above the sheet and 45 below it. Such heating will effect further shrinkage of the surface films so that the composite sheet is subjected to another ironing action such as by upwardly arched bars 46 and 47 and by a downwardly arched bar 48. Similar to the location of bar 42, bar 46 is disposed between downwardly curved bar 43 and upwardly curved bar 47 so that only the central portion of the composite sheet is pressed against bar 46. This leaves the edge portions of the surface films to shrink entirely out of contact with an engaging surface while still adequately supporting the sheet, and as the sheet is drawn across the additional bars 47 and 48, the wrinkles extending lengthwise of the sheet are dissipated.

Preferably the last ironing rod 48 is located just inside the oven 5 where the composite sheet is heated to accelerate setting of the resin. The various portions of the surface films as they reach the bar 48 will be shrunk substantially to the maximum degree to which they would be shrunk by the heat of the resin curing oven and consequently no material additional shrinkage of the surface films can be expected. At the same time the heating effect of lamps 40, 41, 44 and 45 will have been so small on the resin that no great reduction in fluidity of the resin will have occurred before passage across bar 48. Immediately after a sheet portion enters the oven 5, therefore, the shape of the sheet may readily be altered to any desired shape of cross section.

The final sheet material may have any of various shapes of cross section such as corrugated, flat, arched, or of other shape. The desired shape of cross section may be produced by using dies of corresponding shape which in this instance are shown as corrugated, cooperating shoes including an upper shoe 50 and a complemental lower shoe 51. These shoes are shown best in Figures 4, 5 and 6. As shown in Figures 2 and 4, the first pair of such shoes is spaced a substantial distance from the entering end of the oven to enable the cure of the resin to be initiated and to guide the sheet from unwrinkled condition as it crosses bar 48 into transversely gathered shape corresponding to the corrugated conformation of the shoes at the point of entrance between the shoes of the first pair.

Arranged along the length of the curing oven 5 is a number of pairs of sheet forming shoes, all of which may be identical. A practical arrangement has been found to use shoes approximately one foot in width in the direction of travel of the sheet and spaced apart approximately thirty inches on centers. The lower shoes are stationary and serve to support the sheet as it is drawn through the ovens while at the same time exposing it to the circulating hot air of the oven. This exposure not only affords an economical transfer of heat to the sheet but also in the exothermic stages of the cure allows the circulating air of controlled temperature to carry heat away from the sheet. It may not be necessary for all the upper shoes to engage the sheet at all times. This depends upon the speed of the sheet through the oven and the rapidity of cure. The shoes do not exert any great pressure on the sheet material, for prior to appreciable setting of the resin it may be formed very easily so that it is merely necessary to preserve the cross-sectional shape of the sheet formed by the first shoes until the resin has set sufficiently so that the cross section of the sheet will be maintained accurately. The action of the shoes is more that of ironing than of compressing so that the sheet is repeatedly smoothed into the desired shape of cross section until the set resin maintains such shape by reason of its rigidity when set.

The lower shoe in each instance may be made of corrugated aluminum sheet material properly supported and covered by soft surfacing material such as felt, having a low coefficient of friction. These bottom dies 51 may be supported from the structure of the oven 5 by suitable legs 52. These lower dies will be aligned in registry lengthwise of the direction of movement of the sheet material. The upper dies 50 may also be formed of corrugated sheet aluminum, arranged complementally to the corrugations in the lower shoe 51 in each instance. The material of the upper shoes or dies may also be provided with a soft smoothing surface, such as of cloth or felt. Even though the upper shoes may be made principally of aluminium, it is not necessary to increase their weight to produce the proper molding effect on the sheet S, because, as mentioned previously, the resin in its initial setting stages is very soft, so that the sheet may be molded into the desired cross sectional shape corresponding to the shoes simply by the ironing action of such shoes.

Despite the low coefficient of friction of the shoe surfaces with the sheet material being drawn between them and the slight pressure of the shoes on the sheet material, there will, nevertheless, be appreciable friction between the sheet and the shoes, so that the sheet will tend to drag the shoes with it through the apparatus unless lengthwise movement of the shoes is restrained. As mentioned previously, the lower shoes are supported by the legs 52, so that they cannot be moved by travel of the sheet material across them. The upper shoes float on the sheet and tend to be moved edgewise with it. To restrain such movement a rod 53 is disposed at each end of the first upper shoe, and each such rod has one end connected to the hood of the oven 5 and the other end connected to a corner of the upper shoe. Additional rods 54 are connected between adjacent edges of the upper shoes in successive die pairs.

In order to control more readily the temperature of the composite sheet as it passes through the oven, it is desirable to divide the oven into several sections numbered 55, 56, 57 and 58 in Figure 1 and Figure 4, arranged in the order in which the sheet progresses. Preferably the last oven section is spaced a considerable distance from the main oven in which the sections are arranged in a group. A table section 59 bridges the gap between the main oven section and the final section. While the number of oven sections, the length of each, or the aggregate length of all the sections is not critical and may be varied according to the particular desires of the sheet manufacturer, the arrangement described is entirely practical. The reason for the oven being sectionalized is that more heat must be supplied in the first oven section to bring the sheet up to the desired temperature than is necessary in subsequent oven sections to maintain the sheet at a sufficiently high temperature. In fact, setting of the resin is an exothermic reaction so that in the later stages of the curing operation the desired temperature of the sheet may be maintained with the addition of little or no heat. It has been found desirable to cure the resin in a final step at a relatively high temperature, and this is accomplished in the separate oven section 58.

Heat may be supplied separately to each oven section to facilitate the control of heat and each section of the oven is shown as having heat supplied to it by two burner units in Figure 1. All of these burner units designated 6 may be of the same type and may be manually or automatically controlled, such as by suitable thermostatic equipment. Each burner unit includes a burner chamber 60 heated by the combustion of gas or oil, or by electric resistance units. Since the resin is inflammable, it is preferred that hot air rather than products of combustion be blown into the oven by a blower 61 driven by a motor 62. Air may be recirculated through each oven compartment through a pipe 63, such air being reheated by the heater or burner, as well as being supplemented by air drawn into the opening 64 to replace air escaping through the slots 65 in the oven walls, through which the sheet S travels.

Spacing the pairs of shoes apart a substantial distance as described affords opportunity for direct access of the air to the sheet material. Additional exposure of the sheet may be afforded by providing a lifting rod 66 attached to the center of each upper shoe, by which that shoe may be lifted a substantial distance above the lower shoe. As shown in Figure 6, the upper end of each rod 66 is pivotally connected to a lever arm 67, one end of which is fixedly pivoted to a bracket 68 and the other end of which may be swung upward about its pivoted end and supported in the broken-line position shown in Figure 6 by a leg 69 pivotally mounted on it. The anchor links, connecting links and lifting rods for the upper shoes 50 are similarly numbered in each section of the oven.

The length of the oven will depend largely upon the speed of travel of the sheet material through it, but the timing should be such that the sheet will be brought up to a temperature of approximately 180° F. in about five minutes, the temperature of the sheet will be maintained substantially at such temperature for approximately another ten minutes, and then will be subjected to a final heating in the neighborhood of 250° F. for a period of about five minutes. With the oven design described, therefore, the sheet will be raised to the first temperature of the order of 180° F. during its passage through the first oven section 55 and by about the time it reaches the second oven section 56. The heat will be maintained at this temperature by suitable regulation of the heaters as the sheet progresses through sections 56 and 57, and perhaps part of the gap 59. In the first portion of section 58 the temperature will be raised to 250° F. and held for several minutes.

Following completing of the curing cycle the formed sheet will pass into the trimming section of the apparatus shown in Figures 7 and 8. It will be remembered that the surface films LF and UF project edgewise a considerable distance beyond the glass mat filler and are glued together. Moreover, usually a strip of clear resin which is brittle and has little strength has set beyond the glass mat. Consequently, it is desirable to trim the edges of the sheet back a substantial distance to leave only a glass mat reinforced resin core covered by the upper and lower surface films over the entire trimmed width of the sheet. Such trimming may be effected by abrasive cut-off wheels 7 disposed one on each side of the sheet's path of travel and driven by a motor 70 through a belt 71. Such cut-off mechanism may be supported by a bracket 72 adjustably mounted on a post 73 for vertical movement to dispose the wheels 7 in proper relationship to the sheet S. A blower duct 74 will remove dust produced by the trimming operation.

Sheets of the desired length may be cut from the continuous sheet without interrupting its travel by utilizing a traveling abrasive cut-off carriage 75, the movement of which is synchronized with the travel of the sheet. This carriage spans the sheet and is supported by legs 76 having rollers 77 riding on tracks 78 extending parallel to the direction of movement of the sheet S. The movement of the carriage along its tracks during the sheet severing operation is synchronized with the travel of the sheet, and after the completion of a transverse cut this cutting mechanism is returned automatically to its initial position, ready to cut the sheet again when it has moved a distance equal to the next sheet unit length.

The main drive motor 8 for the sheet propelling mechanism described hereafter drives chain 80 to turn sprocket 81 for moving chain 82 along a path parallel to track 78, and at the same speed as sheet S is moved. Carriage 75 carries a clamp 83 which may be air-operated or electromagnetically operated to grip the chain when a transverse cutting operation is to be initiated, and such gripping action continues until after the abrasive cut-off wheel 84 has completed its cutting movement and has returned to its initial position ready to make another cut. A safety limit switch 83' may be arranged on the clamping member support to engage a stop 83" for disengaging the clamp in the event that the normal control mechanism fails to operate or such limit switch arrangement may be utilized as a normal control if desired.

The abrasive cut-off wheel 84 is suitably mounted on a traveler 85 which also carries the cutter drive motor 86 connected by a belt to the cutter and is supported by guide channels 87 of the carriage 75. These channels also carry chains 88 connected to the opposite ends of the traveler 85 for propelling it along the channels 87 and such chains are driven by an air motor or an electric motor 89 mounted on the carriage. Return of the carriage in the direction opposite that in which it is moved by chain 82 is effected by the piston rod 9 of a fluid pressure cylinder 90, preferably air-actuated.

Chain 82 may drive an auxiliary chain 91 turning a roll 92 on which the sheet material at the discharge side of the transverse cut-off device rests. This roll may have a strip of friction material such as rubber or leather 93 wound spirally about it to effect a light friction grip on the sheet material. The periphery of this roll preferably travels somewhat faster than the continuous portion of the sheet, so that when a sheet unit has been severed this roll will propel it away from the endless sheet gradually to deposit it on a stack of completed sheet units.

In the description of the apparatus thus far the sheet material has been discussed as moving through the apparatus without any reference to mechanism effecting such movement. Progress of the sheet material through the apparatus is effected slowly and uniformly by cooperating endless tracks or endless tread belts including lower chains or belts 100 carrying tread bars 101 extending between them and upper chains or belts 102 carrying tread bars 103 extending between them. The lower chains are mounted on sprockets secured to shafts 104 and 105, the latter being driven by chain 8 and carrying also sprocket 81.

Because the entire length of the sheet material is drawn longitudinally through the apparatus by the endless tracks, it is important that the tension exerted on the sheet material be constant and steady. Consequently, the motor 8 should have very low speed, high torque characteristics, such as an air motor or a geared head electric motor capable of moving chain 80 slowly and without jerks while applying great power to it. The tread bars 101 of the lower track and 103 of the upper track, as shown best in Figure 9, will be formed of a shape complemental to the cross-sectional shape of the sheet, so that in the particular instance illustrated they are corrugated. Moreover, the tread bars of the upper and lower tracks are arranged transversely of the direction of sheet movement such that the corrugations interfit to effect intimate contact with the surfaces of the sheet. Also, the tread bars are placed close together so as to engage a large area of the sheet surface, and the tread bar surfaces may be made of high friction material, such as rubber, to effect a firm grip on the sheet.

With tread bars thus constructed it is not necessary that the tracks exert great clamping pressure on the sheet material. If the weight of the upper track and its supporting mechanism simply bears on the sheet material and presses it against the stationarily supported lower track, adequate traction should be afforded. To enable the weight of the upper track to be thus exerted on the sheet material, the upper track assembly may be pivotally mounted about a shaft 106 carrying the sprockets for supporting the track chains at one end, while the shaft 107 carrying the sprockets for supporting the track chains at the other end of the track is mounted on the swinging ends of arms 10, swingable about the axis of shaft 106. The swinging ends of arms 108 may be raised by links 109 connected between the swinging ends of such arms and the swinging end of a lifting lever 110, swingable about the fulcrum pivot 111 by downward movement of the handle 112 on the other end of the lever. This lever may be swung downward until the link 109 moves across the axis of pivot 111 and engages the stop 113. In that position the upper track supporting arms 108 will remain suspended to hold the upper track in the broken-line position illustrated in Figure 7.

Because of the large gripping area afforded by the tread bar surfaces of the upper track when it is in its downwardly swung position engaging the upper surface of the sheet material as in full lines in Figure 7, it is not necessary to drive the upper track positively, but it may serve merely as a pressure element to hold the sheet material in firm tractive engagement with the lower track tread bars. More positive tractive effort can be assured, however, if both the upper and lower tracks are powered, and consequently it is preferred that a chain 114 interconnect a sprocket on shaft 104 of the lower track with a sprocket on shaft 106 of the upper track. In order to drive shaft 106 in the direction opposite shaft 104 so that the lower stretch of the upper track and the upper stretch of the lower track will move in the same direction, it is necessary that the chain 114 move in a figure-eight path, as indicated in Figures 7 and 9.

In operating the apparatus the surface films, UF from roll 10 and LF from roll 11, will be drawn from their respective rolls passed about their tighteners, but their tighteners may be swung to inoperative positions, and then their leading ends passed between rolls 16 and 18. These upper and lower films alone may then be drawn by hand over the rods 4 and 42, beneath rod 43, over rods 46 and 47, and beneath rod 48 into the oven. All the levers 67 will be raised to lift the upper shoes 50 into their upper positions, so that the upper and lower films may be passed between the shoes of each pair. Suitable access holes, not shown in the drawings, will be provided in the walls of the oven, through which an operator may reach to grasp the surface films and thread them through the apparatus in this manner.

Following the same procedure, after the surface films have been passed entirely through the oven sections 55, 56 and 57, and across the exposed sheet supporting structure 59, the surface films will be threaded between the upper and lower shoes in oven section 58. While the apparatus is being set up in this manner, the edging disks 7 may be raised out of the path of the sheet material by sliding brackets 72 upward along post 73. The surface films are then fed on between the upper and lower tracks with the arms 108 swung by lever 110 into the broken-line position of Figure 7. When the surface films have reached this position, the lever 110 will be swung in a counterclockwise direction about its pivot 111, as seen in Figure 7, to lower the upper track into engagement with the surface films. The motor 8 may then be started to begin pulling the surface films mechanically through the apparatus, while the glass mat end is passed beneath roll 24, which may be raised for this purpose, and fed between the films passing between upper and lower rolls 16 and 18. Roll 16 may also be raised until an appreciable portion of the glass mat has been fed past these rolls.

Operation of the oven heaters may then be started, and when the oven approaches operating temperature the surface film preheating lamps 40, 41, 44 and 45 may be turned on, appropriate upper shoes 50 lowered onto the lower shoes, roll 16 lowered to press against the lower roll 18, roll 24 lowered to its operative position, and brushes 29, 33 and 34 adjusted properly. The resin feed mechanism, including the control valve for supply pipe 20 and the slide valve 21 in feeder trough 2, may be set to dispense resin, and the motor 8 energized to pull the composite sheet S through at the desired rate. Tighteners 14 and 15 will then be adjusted for the proper tension of the surface film. When the glass mat core has progressed through the final oven section 58, the edging cutters 7 may be lowered to their operative position and the brackets 72 clamped on the posts 73 so that the resin sheet material will be cut to proper width.

Up to this point it is not necessary that the transverse cut-off mechanism be operated, for the cellophane or other surfacing film material can merely bunch up at the end of the table and be torn off. When the resin sheet material emerges from between the endless tracks, however, the transverse cut-off mechanism may be started, and an initial reference end cut made. Thereafter the cut-off mechanism may be operated either manually as desired or by suitable automatic control mechanism, so that when a position on the sheet material corresponding to a desired unit end has reached the position of cut-off wheel 84, the clamp 83 will be energized to clamp chain 82, synchronizing movement of carriage 75 with lengthwise movement of the sheet. Thereupon motor 89 will be energized to transverse the traveler 85 along its guides 87, while motor 86 rotates the abrasive cut-off wheel. When the cutter has completed its movement along the carriage 75 to sever the sheet, the direction of rotation of motor 89 will be reversed to return the traveler to its initial side while the clamp 83 remains operative to move the carriage in synchronism with the sheet material. By suitable control mechanism, such as the limit switch 83' and stop 83'', clamp 83 then will be released and cylinder 90 energized to reciprocate piston rod 9 for returning carriage 75 to its initial position where it will remain until the next unit is to be severed.

The length of heating period and temperatures are subject to reasonable variation, so that it is possible to alter the speed of travel of the sheet material through the forming apparatus within reasonable limits as far as the curing of the resin is concerned. Perhaps the most critical feature of the process is the time during which the glass mat soaks in the resin before the sheet is consolidated between the presser rolls 16 and 18. In order to insure that there are no dry spots in the sheet's core lacking sufficient resin distribution, and to afford ample opportunity for the resin to displace all air originally surrounding the fibers of the glass mat, the soaking time between roll 24 and rolls 16 and 18 should be at least three-quarters of a minute. If the soaking time appreciably exceeds one and one-quarter minutes, however, the glass fibers will be free to float freely about in the resin and may bunch up instead of remaining in a layer of approximately uniform thickness as they are in the glass mat.

On the other hand, it may be desirable to move the sheet material through the oven at a slow speed and relatively low heat, or at a rapid speed and higher heat. Such movement through the oven might be varied, for example, between two feet a minute and four to six feet a minute, depending upon the length of the oven, its temperature, and the time desired to set the resin. Such wide variation in speed cannot safely be accommodated in apparatus where the glass mat applying roll 13 and the consolidating rolls 16 and 18 are spaced apart an unvariable distance. In Figure 13 an arrangement is illustrated enabling this spacing to be altered.

In this mechanism the resin supply trough 2, the doctor blade 22, the glass mat laying roll 24, and its supporting guide rods 25 are all mounted on a carriage 115 supported by wheels 116 running on tracks 117 extending along opposite sides of the table 13. The guide roller 12 and tightener roll 14 for the lower surface film LF are mounted far enough from the consolidated rolls 16 and 18 so that when the carriage is in its farthest position to the left, in the solid-line position shown in Figure 13, the resin will be deposited on the lower cellophane sheet a reasonable distance ahead of roller 12. The carriage may be clamped in this position or in any other adjusted position between such solid-line position and the broken-line position shown in Figure 13 by clamps 118 which may be tightened against the bottom of rails 117.

With a movable resin supply and spreading mechanism arrangement such as shown in Figure 13, it will be evident that the resin barrier formed by the channel 3 and strip 30 shown in Figure 10 must extend to the left approximately to roll 12 irrespective of the position of the carriage 115 along the track and consequently will be supported from the apparatus framework independently of the doctor blade in a suitable and convenient manner. When the sheet material is progressing through the apparatus relatively slowly therefore, the carriage 115 will be set in the broken-line position or at some location toward the right from the solid-line position shown in Figure 13, so that the glass mat will not soak in the resin during its travel from roll 24 to rolls 16 and 18 too long. When the rate of travel of the sheet material through the machine is increased, however, the carriage 115 may be moved appropriately to the left so that, despite the increased speed, the soaking time for the glass mat between roll 24 and rolls 16 and 18 may be maintained approximately the same, although the resin curing time during passage of the sheet material through the oven 5 is materially reduced.

As has been discussed above, cellophane and equivalent surfacing film materials suitable for use in the manufacture of my sheet product shrink when heated. In the apparatus of Figures 2 and 3 the surface film material is heated after the surface films and interposed glass mat and resin have been assembled. While the heating at that stage may serve to preheat the resin also to some extent, heat absorbed by the resin necessarily reduces the amount of heat available for shrinking the surface film material. An alternative type of arrangement is shown in Figure 14, in which the lower surface film LF and the upper surface film UF are heated and pre-shrunk before they are assembled with each other, or with the resin and glass mat components.

The feeding and tensioning features of the apparatus shown in Figure 14 are the same as those shown and described in connection with Figures 2 and 3, and the parts have been designated by the same numbers, so that it is not necessary to describe these elements further. In this mechanism, however, instead of providing the heat lamps 40, 41, 44 and 45 for heating the composite sheet S, a heat lamp 119 is mounted to direct heat on the lower surface film LF immediately after it passes the tightener roller 14, and a heat lamp 120 directs heat on the upper surface film UF shortly after it leaves the tightener 15. Shrinkage of the surface films will then begin at these locations, respectively, and because there is no additional material to absorb heat, the shrinkage action will take place much more rapidly.

To avoid wrinkling of the lower film caused by shrinkage, the guide roller 12 is replaced by roller 121 which is of the oscillating, length-varying, slat type. Alternate slats are secured to opposite ends of the roll and cam mechanism effects relative axial movement of adjacent slats so as to continually agitate the film transversely and interrupt any tendency for the film to cling to the roll which would impede its shrinking action. At the same time such slat movement would smooth out the film, so that as it passes onto the table 13 it will have been shrunk completely and lie smoothly.

Similarly, the upper surface film UF passes from the zone heated by lamp 120 over an oscillating, length-varying, slat roll 122, interposed between the heated zone and consolidating rolls 16 and 18. Oscillation of the slats in this roll in the same way prevents any tendency of the surface film to stick to the roll surface, and the slat movement also exerts a smoothing effect on the film, so that it is completely shrunk and contacts roll 16 smoothly.

I claim as my invention:

1. The method of making composite sheet material which comprises moving longitudinally a lower surface film, depositing heat settable liquid resin on such lower surface film, during continued longitudinal movement of such lower surface film carrying the resin, laying into such liquid resin stranded reinforcing material and thereby displacing the air in such reinforcing material with resin, covering the reinforcing material and resin with an upper surface film, consolidating the intermediate resin and reinforcing material by applying pressure to the lower surface film and the upper surface film and thus forming a composite sheet, moving such composite sheet longitudinally through a heated zone and thereby setting the resin, and during such movement through at least the initial portion of such heated zone engaging opposite surfaces of the composite sheet and thereby shaping into a desired form the cross-sectional configuration of the sheet.

2. The method of making composite sheet material which comprises moving longitudinally a lower surface film, depositing heat settable liquid resin on such lower surface film, during continued longitudinal movement of such lower surface film carrying the resin, laying glass mat into such resin and thereby displacing the air in such glass mat with resin, covering the glass mat and resin with an upper surface film, consolidating the intermediate resin and glass mat by applying pressure to the lower surface film and the upper surface film and thus forming a composite sheet, moving such composite sheet longitudinally through a heated zone and thereby setting the resin, and during such movement through at least the initial portion of such heated zone engaging opposite surfaces of the composite sheet and thereby shaping into a desired form the cross-sectional configuration of the sheet.

3. The method of processing composite sheet material which comprises superimposing a cellophane lower surface film, an intermediate layer of liquid resin and reinforcing material and a cellophane upper surface film, shrinking the upper and lower surface films by heating them while such resin remains fluid, and while unset, and, during such film shrinking operation, smoothing the surface films and thereby eliminating therefrom wrinkles caused by such shrinking.

4. The method of processing composite sheet material which comprises laminating cellophane surface films with an intermediate layer of resin and stranded reinforcing material therebetween into a composite sheet, prior to such laminating shrinking the surface films by heating them initially, and thereafter heating the composite sheet to a temperature lower than the temperature to which the surface films were heated initially and thereby setting the resin.

5. In the method of processing composite sheet material including a cellophane lower surface film, an intermediate layer of resin and reinforcing material and a cellophane upper surface film consolidated into a composite sheet, the steps of removing wrinkles from the sheet which comprises drawing such composite sheet longitudinally, during such longitudinal drawing smoothing one side of such composite sheet concavely transversely of the direction of sheet movement, and at a subsequent location in such sheet movement smoothing the opposite side of such sheet and thereby curving such opposite side concavely transversely of the direction of sheet movement.

6. In the method of processing composite sheet material the steps of laminating two surface films with an intermediate layer of liquid binder and reinforcing material between such surface films of a width less than the width of such surface films and disposed to leave edge portions of the surface films projecting laterally beyond such intermediate reinforcing material layer, consolidating such binder and reinforcing material by applying pressure to such surface films, and gluing together the inner surfaces of such edge portions of such surface films projecting laterally beyond the intermediate reinforcing material layer and thereby retaining the liquid binder between such surface films.

7. The method of processing composite sheet material which comprises laminating two surface films with an intermediate layer of heat settable liquid resin and reinforcing material between such surface films, consolidating such resin and reinforcing material by applying pressure to such surface films and thus forming a composite sheet, moving such composite sheet longitudinally through a heated zone and thereby setting the resin, during such movement through at least the initial portion of said heated zone engaging opposite surfaces of the composite sheet in a shape gathered transversely of its direction of movement and thereby shaping the cross-sectional configuration of the sheet into a desired form gathered transversely of its direction of movement, and between such consolidating and such engagement of the opposite sheet surfaces moving longitudinally such sheet unconfined and progressively gathering the composite sheet transversely of its direction of movement.

8. The method of making composite sheet material which comprises laminating two surface films with an intermediate layer of heat settable liquid resin and stranded reinforcing material between such surface films, consolidating such resin and reinforcing material by applying pressure to such surface films and thus forming a composite sheet, moving such composite sheet longitudinally through a heated zone and thereby setting the resin, during such movement through at least the initial portion of said heated zone drawing such composite sheet between dies engaged with and smoothing opposite sides of such composite sheet in a shape gathered transversely of its direction of movement and thereby shaping the cross-sectional configuration of the sheet into a desired form gathered transversely of its direction of movement, and between such consolidating and such die engagement moving longitudinally such sheet unconfined and progressively gathering the composite sheet transversely of its direction of movement.

9. Apparatus for processing composite sheet material, comprising supply means operable to supply superposed surface films and polymerizable liquid resin therebetween for forming composite sheet material, polymerizing means operable to set the resin between such surface films during longitudinal movement of such composite sheet material along a substantially linear path through said polymerizing means, complemental cooperating movable gripping members located respectively at opposite sides of such path at the discharge side of said polymerizing means for clamping therebetween a portion of such composite sheet material in which the resin is set, carrier means supporting said gripping members, and drive means moving said carrier means and said gripping members a substantial distance linearly in the direction of movement of such composite sheet material to pull it through said polymerizing means.

10. The method of making composite sheet material which comprises moving a cellophane lower surface film longitudinally, depositing on such lower film heat settable liquid resin, during continued movement of such lower film carrying liquid resin laying into the resin stranded reinforcing material, covering the reinforcing material with a cellophane upper surface film, consolidating the intermediate reinforcing material and resin by applying pressure to the lower surface film and the upper film and thus forming a composite sheet, moving such composite sheet longitudinally, and during such movement initially heating its upper and lower surfaces and thereby shrinking the surface films, during continued longitudinal movement of the composite sheet smoothing opposite sides thereof and thereby removing wrinkles caused by shrinking of the surface films, moving the composite sheet longitudinally through a zone heated to a temperature lower than the temperature of initial heating and thereby setting the resin and during such movement engaging opposite surfaces of the sheet and thereby shaping the cross-sectional configuration of the sheet during setting of the resin.

11. The method of making composite sheet material which comprises moving a cellophane lower surface film longitudinally, depositing on such lower film heat settable liquid resin, during continued movement of such lower film carrying resin laying into the resin a sheet of glass mat material and moving such sheet of glass mat material longitudinally conjointly with the lower film, covering the glass mat with a cellophane upper surface film, consolidating the intermediate glass mat sheet and resin by applying pressure to the lower surface film and the upper film and thus forming a composite sheet, moving such composite sheet longitudinally, and during such movement initially heating its upper and lower surfaces and thereby shrinking the surface films, during continued longitudinal movement of the composite sheet smoothing opposite sides thereof and thereby removing wrinkles caused by shrinking of the surface films, moving the composite sheet longitudinally through a zone heated to a temperature lower than the temperature of initial heating and thereby setting the resin, and during such movement engaging opposite surfaces of the sheet and thereby shaping the cross-sectional configuration of the sheet during setting of the resin.

12. Apparatus for making composite sheet material including cellophane surface films and an intermediate layer of resin and stranded reinforcing material between such films, comprising means operable to move such surface films longitudinally with heat settable liquid resin therebetween, heating means disposed along the path of such movement and operable to heat such surface films initially and thereby shrink such films prior to setting of the resin from fluid condition, and additional heating means disposed along such path of movement beyond said first heating means and operable to heat the resin and thereby set it after the surface films have been shrunk.

13. The apparatus defined in claim 12, and sheet-smoothing means engageable with a surface film, interposed between the heating means and operable, prior to heating of the sheet for setting the resin, to smooth from the surface film engaged thereby wrinkles caused by shrinking of such film.

14. Apparatus for processing composite sheet material comprising means operable to move longitudinally a surface film, means operable to deposit liquid binder on such film, and cooperating upper and lower elongated ridge members engageable with opposite sides of such surface film and having their lengths extending in a direction substantially parallel to the direction of movement of such film limiting flow of such binder transversely of the direction of film movement.

15. Apparatus for processing composite sheet material comprising means operable to move longitudinally a surface film, means operable to deposit liquid binder on such surface film, an elongated channel member having its flanges engageable by one side of such surface film and having its length extending in a direction substantially parallel to the direction of movement of such film, and a strip member disposed between the flanges of said channel member, and engaging the other side of such film and pressing it into such channel to limit flow of such resin transversely of the direction of flow movement.

16. Apparatus for making composite sheet material including surface films and an intermediate layer of resin and stranded reinforcing material between such films, comprising an oven, and sheet-engaging shoes received in said oven and spaced apart lengthwise of it and engageable respectively with portions of the surface films alternating with unconfined portions of such films for smoothing opposite sides of the composite sheet as it is drawn between said shoes during its passage through said oven.

17. Apparatus for making composite sheet material comprising an oven forming a heated path through which composite sheet material including a lower surface film, an intermediate layer of reinforcing material and resin and an upper surface film may be moved longitudinally, and cooperating endless tread belts disposed adjacent to each other at the discharge side of said oven, operable to grip therebetween a portion of such composite sheet in which the resin has set, and being further operable to draw through said oven the composite sheet thus gripped to set the resin in the portion of the sheet passing through the oven.

18. In the method of processing composite sheet material the steps of laminating two surface films with an intermediate layer of liquid resin and reinforcing material between such surface films of a width less than the width of such surface films and disposed to leave edge portions of the surface films projecting laterally beyond such intermediate reinforcing material layer, and bonding together such edge portions of such surface films projecting laterally beyond the intermediate reinforcing material layer and thereby retaining the resin between such surface films until the resin has set.

19. In the method of processing composite sheet material the steps of laminating two surface films with an intermediate layer of heat settable liquid resin and reinforcing material between such surface films of a width less than the width of such surface films and disposed to leave edge portions of the surface films projecting laterally beyond such intermediate reinforcing material layer, bonding together such edge portions of such surface films projecting laterally beyond the intermediate reinforcing material layer and thereby retaining the resin between such surface films until the resin has set, and after such bonding heating the laminate and thereby setting the resin.

20. In the method of processing composite sheet material the steps of laminating two surface films with an intermediate layer of liquid resin and reinforcing material between such surface films of a width less than the width of such surface films and disposed to leave edge portions of the surface films projecting laterally beyond such intermediate reinforcing material layer, consolidating such resin and reinforcing material by applying pressure to such surface films, and bonding together such edge portions of such surface films projecting laterally beyond the intermediate reinforcing material layer and thereby retaining the resin between such surface films until the resin has set.

21. The method of making composite sheet material which comprises laminating two surface films with an intermediate layer of resin and stranded reinforcing material between such surface films, consolidating such laminate into a composite sheet, moving such composite sheet longitudinally through a heated zone and thereby setting the resin, and during such movement through at least the initial portion of said heated zone engaging opposite sides of each portion of such composite sheet intermittently, successively between dies arranged in succession in such heated zone, and thereby shaping into a desired form the cross-sectional configuration of the sheet.

22. The method of making composite sheet material which comprises moving longitudinally a lower surface film, depositing on such lower surface film heat settable liquid resin, during continued longitudinal movement of such lower surface film carrying the resin laying stranded resinforcing material into such resin and thereby displacing the air in such reinforcing material with resin, covering the reinforcing material and resin with an upper surface film, consolidating the intermediate resin and reinforcing material by applying pressure to the lower surface film and the upper surface film and thus forming a composite sheet, moving such composite sheet longitudinally through a heated zone and thereby setting the resin, and during such movement through at least the initial portion of such heated zone deforming the composite sheet from planar shape into a shape gathered transversely of its direction of movement by engaging opposite surfaces of the composite sheet and thereby shaping into a desired nonplanar form the cross-sectional configuration of the sheet.

23. The method of processing composite sheet material which comprises superimposing a cellophane lower surface film, an intermediate layer of liquid resin and reinforcing material and a cellophane upper surface film, heating the surface films and the resin therebetween and thereby setting the resin, and prior to such resin setting heating step shrinking the films by heating them to a temperature higher than the temperature of the resin setting heating.

24. The method of processing composite sheet material including a cellophane lower surface film and a cellophane upper surface film and resin therebetween which comprises shrinking the lower surface film transversely of its length by initially heating it, shrinking the upper surface film transversely of its length by initially heating it, placing between the upper and lower surface films thus shrunk an intermediate layer of liquid resin and reinforcing material, and heating the upper and lower surface films with the resin therebetween to a temperature lower than the temperature to which the surface films were heated initially and thereby setting the resin between the shrunk surface films.

25. Apparatus for processing composite sheet material comprising a film supporting table, means operable to move a film longitudinally along such table, two elongated ridge elements having their lengths extending parallel to the direction of movement of the film, spaced apart a substantial distance transversely of such direction of film movement and operable to lift portions of the film overlying said ridge elements above the film portion on the table between said ridge elements, and means operable to deposit liquid binder on such film between said ridge elements, said ridge elements being operable to deter flow of such liquid binder past them transversely of the dirction of film movement.

References Cited in the file of this patent

UNITED STATES PATENTS

| | | |
|---|---|---|
| 1,270,250 | Schenkelberger | June 18, 1918 |
| 1,449,912 | Respess | Mar. 27, 1923 |
| 1,885,280 | Moore | Nov. 1, 1932 |
| 2,407,548 | Goldman | Sept. 10, 1946 |
| 2,456,923 | Cogovan et al. | Dec. 21, 1948 |
| 2,476,282 | Castellan | July 19, 1949 |
| 2,476,582 | Browne et al. | July 19, 1949 |
| 2,523,022 | Horstman | Sept. 19, 1950 |
| 2,561,781 | Bruce | July 24, 1951 |
| 2,562,641 | Saunders | July 31, 1951 |
| 2,571,717 | Howald et al. | Oct. 16, 1951 |
| 2,625,498 | Koch | Jan. 13, 1953 |
| 2,626,883 | Boese | Jan. 27, 1953 |
| 2,637,673 | Barnard | May 5, 1953 |
| 2,671,306 | Slayter | Mar. 9, 1954 |
| 2,704,734 | Draper et al. | Mar. 22, 1955 |
| 2,737,701 | Hubbard et al. | Mar. 13, 1956 |

FOREIGN PATENTS

| | | |
|---|---|---|
| 621,867 | Great Britain | Apr. 21, 1949 |